June 3, 1969   R. A. HEISLER   3,447,866
SLIP-IN LOADING FOR FILM EDITORS
Filed Oct. 6, 1966   Sheet 1 of 4

INVENTOR.
RAYMOND A. HEISLER
BY
Ralph R. Roberts
AGENT

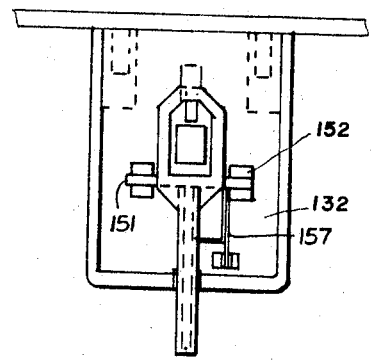

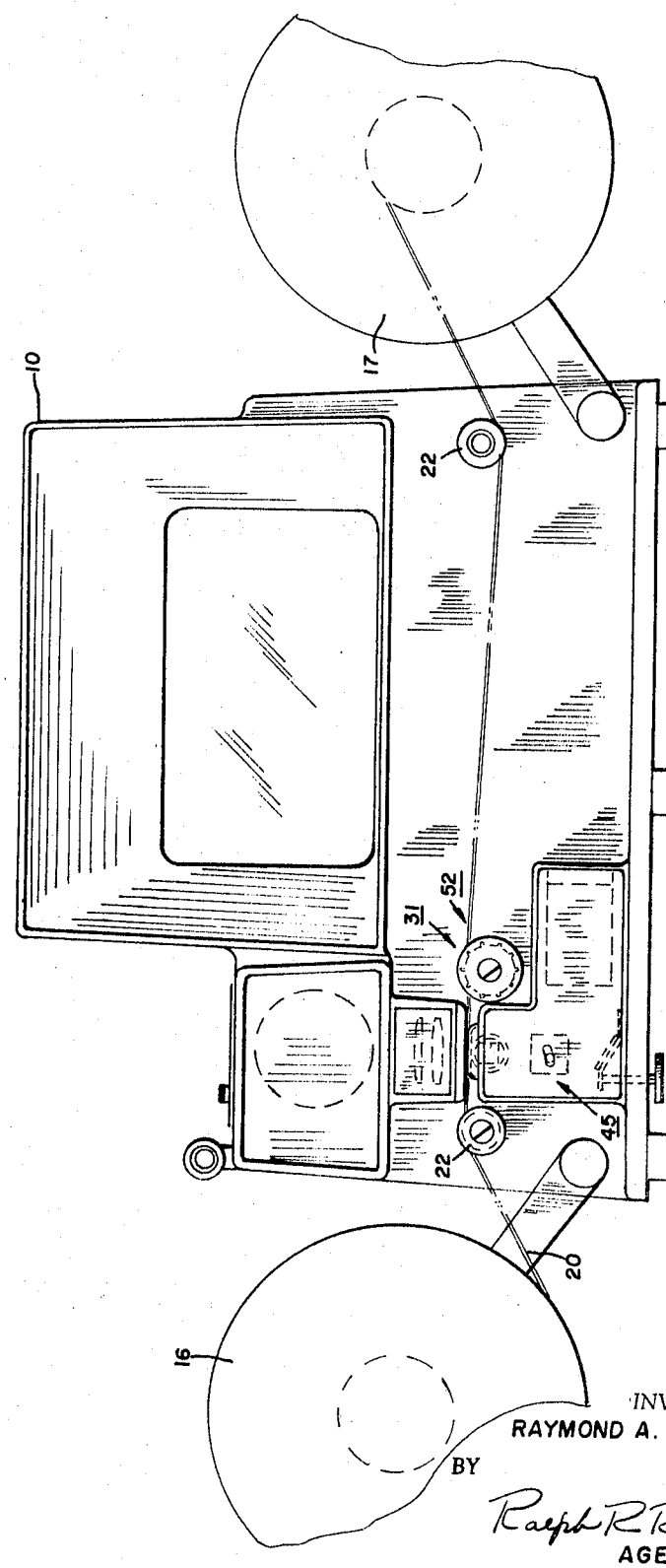

United States Patent Office 3,447,866
Patented June 3, 1969

3,447,866
SLIP-IN LOADING FOR FILM EDITORS
Raymond A. Heisler, 657 Dakota Trail,
Franklin Lakes, N.J. 07417
Filed Oct. 6, 1966, Ser. No. 584,703
Int. Cl. G03b 41/08
U.S. Cl. 352—119                                12 Claims

ABSTRACT OF THE DISCLOSURE

A film editor has a rotating prism interconnected with the shaft of a sprocket roller such that the prism is driven by the film passing about the sprocket roller. The sprocket roller is mounted such that it may be rotated relative to its shaft for synchronizing the film frame with the prism. The sprocket roller has a concave peripheral surface with a groove near one edge for guiding the film and is mounted adjacent one end of a film gate in a position such that the film will be deflected slightly from the plane of the film gate. Two guide rollers having concave peripheral surfaces are positioned, one adjacent the opposite end of the film gate from the sprocket and one between the sprocket and the take-up reel, for maintaining the film in a prescribed path and maintaining the film in contact with the sprocket. The components are spaced apart sufficiently for the film to be inserted laterally into its path through the editor.

This invention relates to a slip-in loading apparatus or means which are a part of a film editor for motion picture film in which the film to be edited is fed from a storage reel to a wind-up reel. Especially is the slip-in loading related to editors wherebetween the reels the film is caused to be brought in the way of a light source operating in combination with a rotating prism, the illuminated picture from the film being passed through this rotating prism from whence it usually, after magnification, is reflected to and from a series of mirrors until it is reflected on a viewing screen. The viewed film is then edited in the usual way at the discretion of the operator.

Particularly this invention relates to a slip-in loading apparatus or arrangement for film editors for motion picture film. These editors are of the home movie type in which film is stored and fed from a first or storage reel to a first guide roller, thence through a picture orienting and generating station comprising a support plate carrying a precisely disposed spring-loaded pressure plate, thence the film is brought tangentially in the way of a drive sprocket. From this sprocket the film is guided by a second guide roller to a second or take-up reel whence the viewed film is stored for further use or operation.

Even more particularly this invention relates to the slip-in feeding arrangement for and the method for self alignment of a motion picture film or other strip-like material having regularly-spaced, tooth-receiving apertures formed therein, the film editor being characterized in that it is often operator powered. This arrangement provides for a film guide means and pathway which, with a film, operates in combination with a tangential engagement of a film aperture engaging sprocket to drive a film frame sequencing means. This feeding arrangement and formation of apparatus provides a path for the sideways slip-in loading of the film by the operator and the self-aligning of the film by the various components as the operator causes the film to be drawn through the editor for viewing. After self-alignment and the establishment of the film on the sprocket teeth, the relationship of the teeth of the sprocket with the frame of the film and an illuminated light path through a rotary prism is adjustably set so as to provide a timed viewing of each frame of film.

BACKGROUND OF THE INVENTION

The current popularity and quality of home movies and especially movies of the eight millimeter size has encouraged the film owner to show the film for personal and other reasons to his family and to many other people. As each reel of developed film usually has many scenes this poses a problem to the owner of arranging a desired series or sequence of scenes on a reel or reels of film. To provide the desired sequence requires editing of the various reels of film and encourages the use of a viewing editor by which an easy way is provided for viewing and marking the film to select the lengths and sequences for the desired assembled reel of film presentation. After cutting, assembling and splicing the reassembled film is often reviewed in the editor to ascertain the perfection of the final arrangement of the film. This desire for effectiveness of presentation has created a wide spread desire and use of home-type film editors. To satisfy this demand many editors have been and are now for sale on the market, some of these editors are very simple and some are very complex or sophisticated, all attempt to solve for the home-movie user the problem of providing a slow easily-monitored film-viewing device having manipulative means for making indications or marks where to cut the film for splicing into a new arrangement. The editors of less complexity and of the hand-fed type are usually less expensive. Generally these editors use a light source magnified and directed toward a rotating prism through which is fed the illuminated picture to other lens or lenses and in combination with various mirrors provide a path to a viewing surface or screen which in the embodiment hereinafter described is preferably four by five inches.

A drive or power source for the rotary prism is customarily provided by employing the film itself as the drive or power source as it, the film, is pulled through the gate section of the film editor. The sequence of apertures provided in most movie film engage the teeth in a sprocketed wheel in the gate mechanism so that as the film is moved through the editor the sprocket is rotated and through power transmitting means such as a gear train rotates the prism. In this well known manner the picture in each frame of film is caused to be projected on the screen so as to be viewed by the editor user. The rotary prism is one method of interrupting the projection image to sequence the frames and provide a reasonably steady picture and with other known gate or shutter mechanisms is usable with this slip-in loading. In any film editor a mechanism arrangement is necessary to feed and advance the film into the light path whether through a shutter or rotating prism. The threading of the film into the pathway of other apparatus is often a rather tedious operation requiring the lifting of gates to form loops and/or manipulating of the film between various guides and sprockets. This threading operation usually requires a certain amount of dexterity and patience for the operator of the film editor to satisfactorily load the film into the feeding path. In the process of editing a quantity of film it often is necessary to load and unload the film many times, whereupon the manipulation of the film into and out of the gate feeding mechanism can be time consuming, annoying, and in certain cases is not always satisfactory. For these reasons the ease and certainty that the slip-in film loading arrangement of the instant invention provides is of great usefulness and satisfaction in film editors.

SUMMARY OF THE INVENTION

In the preferred embodiments shown, and to be more fully described hereinbelow, a film is drawn from a supply reel, which may be the reel upon which the original developed film is delivered to the customer, and from this supply reel the film is led and fed to a first guide roller, thence to a pressure plate assembly into and through which the film is passed and guided. This assembly includes two plates wherein one of the plates is fixed and one of the plates is spring-biased to urge and retain the film upon the fixed plate. After leaving the support plate, the film is tangentially engaged and guided by a troughed and sprocketed roller which as the film is advanced it drives. From this sprocketed roller the film is led to another guide roller which guides and retains the film in alignment. From this roller the film is led to and wound upon a take-up reel which is preferably manually operated. A light source is arranged to coincide with the pressure plate assembly which has a light-framing opening therethrough. A condenser lens is between the light source and in alignment with the light-framing opening of the pressure plate assembly upon and over which the film is passed. Below this opening is a rotating prism in the way of the path of the light source. This prism acts as a gate to intermediately feed or pass the light to an objective lens immediately below and in the path of the projection image. In alignment with and disposed to angularly accept the illuminated film image is a mirror or reflecting surface. From this surface the illuminated image is conventionally projected through a negative lens, thence through a series of mirrors and finally onto an objective screen upon which the film is viewed.

The unique difference in the film gate arrangements of the present invention and the gate arrangements used in other film editors is that my gate arrangements merely require the operator to grossly insert a slack portion of film into a partial engagement and alignment with the movable components of the assembly where upon actuation of the wind-up reel the film is drawn taught and into the light path. In these arrangements the film is brought in the way of the trough in the two guide rollers and the trough-sprocketed roller so that as the film is advanced the film moves laterally into respective shoulder engagements and with the teeth of the sprocket and upon engagement of the teeth and the film apertures the advancing film causes a resultant rotation of the prism. Synchronism between the passing of the apertures of the film across the sprocket teeth and the resulting rotation of the sprocket roller and the rotating of the prisim is provided by a releasable clamping of the sprocket roller in a selected orientation on its own shaft.

There has thus been outlined rather broadly the most important arrangement of apparatus and method of the present invention in order that a detailed description thereof that follows may be better understood and in order that the present contribution to the art may be better appreciated. There are, of course, additional features of the invention that will be described hereafter and which will form the subject of claims appended hereto. Those persons skilled in the art will appreciate that the conception on which the present disclosure is based may be utilized as the basis for designing other like structures for carrying out the several purposes of this invention. It is important, therefore, that the claims be regarded as including such equivalent constructions as do not depart from the concept and scope of this invention.

A specific embodiment of the invention and modification thereof has been chosen for purposes of illustration and description, and is shown in the accompanying drawings forming a part of the specification in which:

FIG. 3 represents a cross-sectional view and in a larger scale a film guide roller of this invention;

FIG. 4 represents a cross-sectional view and in larger scale a troughed-sprocket and guide of this invention;

FIG. 5 represents a fragmentary and somewhat diagrammatic front view of another pressure plate assembly and including a means for forming a small cut or notch in the film as it is stopped in its movement through the pressure plate assembly;

FIG. 6 represents a side view partly in section and partly diagrammatic of the pressure plate assembly of FIG. 5;

FIG. 7 represents a plan view partly diagrammatic of the pressure plate assembly of FIG. 5 and in particular the relationship of the notching mechanism to the light-framing aperture in the assembly;

FIG. 8 represents a sectional view in a larger scale of the trough-sprocket roller as assembled on its shaft and mounted in its frame;

FIG. 9 represents an exploded isometric view of the members forming the sprocket roller assembly of FIG. 8; and FIG. 10 represents a somewhat diagrammatic face view showing the components generally forming another slip-in loading arrangement similar to the arrangement of FIG. 1.

Figure 1:
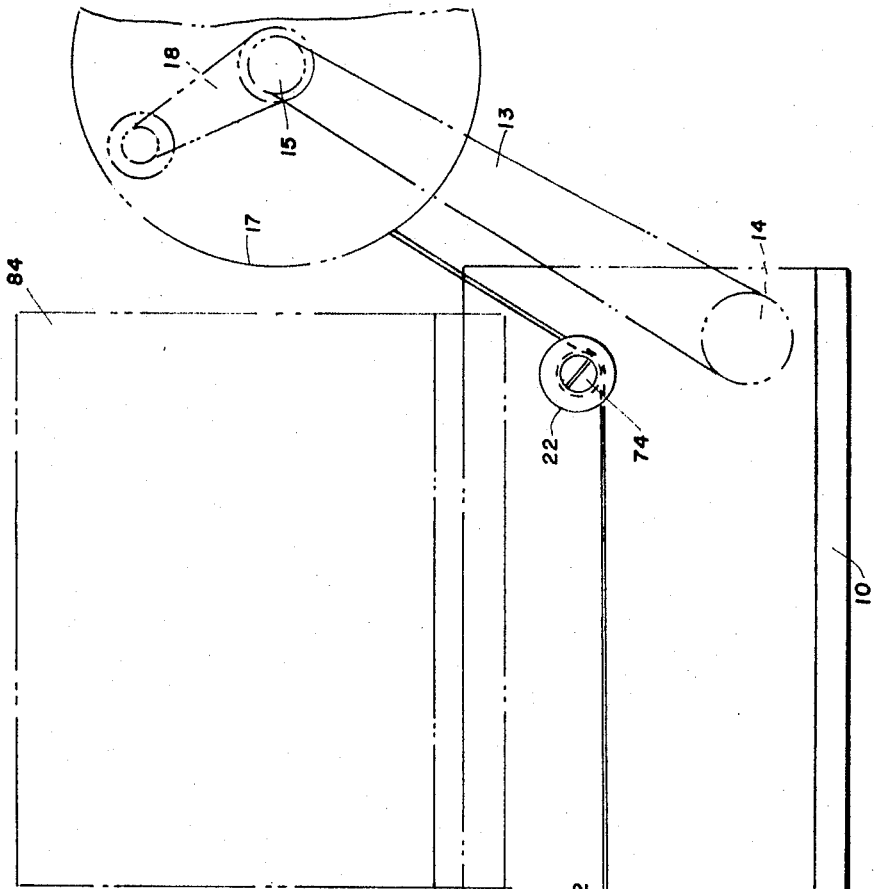
FIG. 1 represents a somewhat diagrammatic face view showing the components generally forming one arrangement of the film transport apparatus and the assembled relationship of each of the components making up this arrangement of the film drive and slip-in loading of the film editor of this invention.
Figure 1:
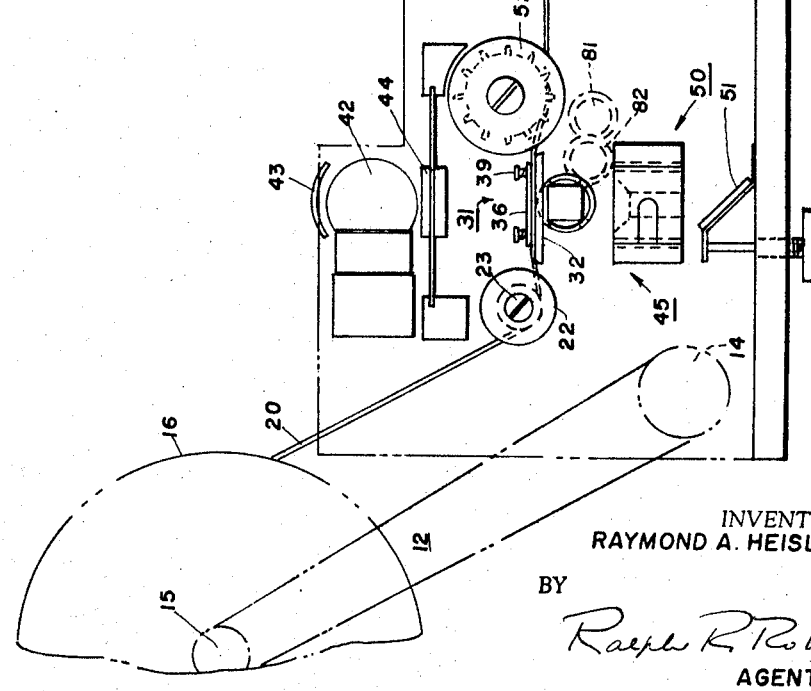
Figure 2:
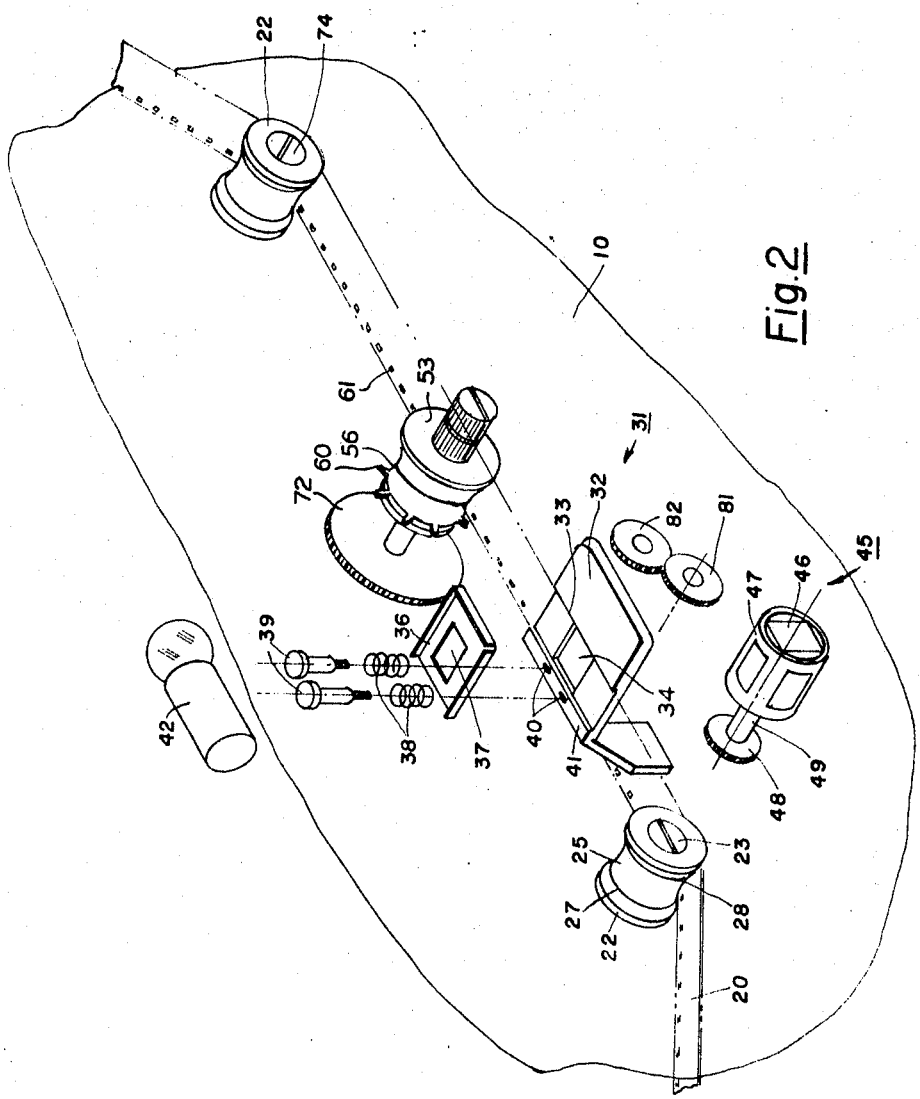
FIG. 2 represents an exploded isometric view of the components generally comprising the film gate mechanism of FIG. 1 and showing the relationship of these components to one another and to the film as it is transported through the film gate.

Referring now to the drawings in detail in which like numbers designate like members throughout the several figures it is to be noted that in FIGS. 1 and 2 there is indicated front face portion of a frame 10 within and upon said frame most if not all of the apparatus of the film editor is mounted. Pivotally mounted on opposite ends of the face of the frame is a left swing arm 12 and a right swing arm 13. These arms are carried by and are rotatable about shouldered pins 14 which, as reduced to practices, are made so as to provide a friction or light interference fit so that each of the arms remain in a position to which they are moved. Detent means not shown and limiting stops not indicated provide means for positively locating desired arm positions and limits of travel of the swing of the arms. Upon the distal or outer end of each arm there is provided a spool retaining spindle 15 which is rotatably mounted and is conventionally constructed so as to accept and removably retain film storage spools designated 16 and 17.

Each spindle 15 is connected to and is rotated preferably by means of a hand crank or short arm 18 of conventional design and construction. The hand crank shown driving spool 17 is mounted directly upon one end of the spool retaining spindle 15, however, in certain desired arrangements the hand crank is mounted on an auxiliary shaft carried in the end of the arm. When so mounted, appropriate gearing or power transmitting means is provided for connecting or transmitting the rotary motion of the auxiliary shaft to the spool retaining spindle and when through a ratio gear train provides a speed differential. Spindles, both direct driven and ratio driven are known in the art and form no part of the invention except as to providing desired and/or necessary elements for the operation of the film editor assembly.

Leading downwardly and to the right from the left spool 16 which is assumed as the play-off spool, is strip-like member 20 which, for the purpose of the present description, is an eight millimeter motion picture film. This film is engaged by a first guide roller 22 carried and freely rotatable on a spool shaft or stud 23 the roller having film guiding means for retaining the lateral position of the film thereon, the guiding means formed in combination with a concave construction. As seen in FIG. 2 and particularly in FIG. 3 the film transporting or guide surface portion of roller 22 is a generally concave arcuate construction with the outer surface designated 25.

Into this surface and at substantially equal distances from a theoretical center line 26 are formed circumferential film retaining notches 27 and 28. The lateral width determination of the spacing between the vertical shoulders of the notches 27 and 28 is slightly greater than is the width or lateral extent of of the film being transported. This spacing between the vertical portions of the notches permits the film to be readily seated as hereinafter described and upon the lateral portions of the notches the film is carried parallel to bore 30 of the guide roller. The bore 30 is sized so that the guide roller is freely rotatable upon the shaft 23 which in the present embodiment is a shoulder bolt having a threaded end adapted to engage and be retained in a predeterminedly located tapped hole in the face of frame 10.

The other end of shaft or blot 23 has a head portion of any desired configuration, the head providing means for retaining the quide roller in a freely rotating relationship on the shaft and in a desired position to the face portion of the frame 10.

Referring again to FIGS. 1 and 2 it is to be noted that film 20 leads from guide roller 22 to a pressure plate assembly 31 in which is provided a film guide, framing aperture and an engaging means for applying a light pressure on the film as it is drawn through the pressure plate assembly.

This assembly comprises a fixed plate 32 which is a stamped metal or a die cast support member having means for being engaged and seated in appropriately sized and spaced holes in the face portion of frame 10 and being attached to this frame portion by cap screws not shown. The upper surface of this plate has both its right- and left-hand edges curved downwardly and the upper portion therebetween provides a table upon which the film is supported as it is pulled or drawn across the plate. A groove 33 in the upper surface extends from one side to the other and in the present instance is about three hundred twenty thousandths of an inch in width and is about twenty thousandths of an inch in depth. This groove provides a guide for the film 20 in its passage over the plate and insures that lateral alignment and spacing is maintained between the film and an aperture 34 of predetermined size and position formed through the plate and in the groove 33 therein. This aperture provides a passageway for the light path of the apparatus and for a lighted view of a frame of film to be transmitted through the plate.

Immediately above plate 32 and mounted thereto is a movable plate 36 which plate is preferably made of sheet metal and is formed with an aperture 37 therein and providing the same light passing function as the aperture 34 in the fixed plate 32. Movable plate 36 is engaged on its upper surface by a pair of small helical springs 38 which are sized so as to slide over and be retained by shoulder screws 39. The heads of these screws retain the outer or upper end of the springs while the body portions of the screws are sized to slidably engage through holes in the plate 36. The threaded ends of the screws engage and are retained in threaded holes 40 in platform portion 41 of the plate 32. In the assembled condition the movable plate 36 is biased toward and rests upon platform portion 41 and as film 20 is brought between the plates 32 and 36 said movable plate is moved upwardly for a short distance against the bias of springs 38. As the lifting force is reduced by the seating of film 20 in groove 33, plate 36 is urged by springs 38 toward and onto the platform portion 41 of shelf 32. The front edge of the platform portion 41 is formed so as to coincide with inner edge of groove 33 and provide an engaging shoulder and guide for the inner or far edge of film 20.

Above the pressure plate assembly and in alignment with the apertures 34 and 37 there is a light source 42 which in the present instance is a light bulb of selected candlepower which is powered or illuminated by a source of electric current not shown or otherwise indicated. To reduce glare and provide a reflecting surface to increase the efficiency of the bulb there is a reflector 43 of conventional configuration and construction. Immediately below the light source and above the plate assembly there is shown a condensing lens 44 mounted in the way of the light path and of determined design, size and construction. This lens is provided so as to receive the light from the source and to concentrate the light into a path passing through the apertures 34 and 37.

Immediately below the plate 32 and in alignment with and in the light path through the apertures there is provided a rotating prism assembly generally designated at 45. This assembly includes a prism 46 carried in a retainer or housing 47 having its inner end adapted to retain a gear 48 which is disposed so as to be carried rearwardly of the face portion of frame 10. In the preferred embodiment the housing 47 has a shaft portion 49 attached to it, the shaft extending rearwardly or inwardly and is rotatably carried in a bearing bore formed in the face panel of frame 10. The drive of this prism will be hereinafter described in conjunction with a toothed sprocket assembly. Below the prism there is an objective lens 50 mounted on the front panel of frame 10 and aligned to lay in the light path. Below objective lens 50 there is a mirror 51 which is the first of a plurality of mirrors most of which are not shown and which are mounted to lie in the light path and to provide a focal path of determined length for the illuminated frame of film.

Positioned to the right of fixed plate 32 is a sprocket roller assembly 52. The positioning of this assembly is particularly noted in FIGS. 1 and 2 while the details are better seen in FIGS. 4, 8 and 9. A troughing sprocketed roller 53 is preferably cast of two halves 53a and 53b although it may be made in one piece. A bore 55 is formed in each half, the bore sized to be a rotatable or running fit upon a portion of a stud shaft 54. The configuration of the transporting surface of the roller 53 includes a central concave portion 56 of arcuate shape formed on the inner adjacent portions of both halves 53a and 53b. The arcuate portion 56 of half 53b has formed in its surface a circumferential notch 57 or groove whose vertical portion provides a shoulder to limit the outward movement of the film when the film has entered the path and the outer edge is supported on the inwardly extending lateral portion of the notch.

The inner half 53a of the sprocket roller is formed with its circumferential surface having a circular band portion 58 which lies in the same radial plane as the lateral portion of notch 57 of outer half 53b. This band provides a support surface for the transport of the inner edge portion of the film 20. The band is formed so as to blend smoothly from the arcuate surface portion 56. Extending upwardly or outwardly from band 58 are a plurality of regularly spaced and aligned sprocket teeth 60. These teeth are of a selected size and configuration and are precisely spaced so as to each engage one of the defined apertures 61 in film 20.

Referring particularly to FIGS. 8 and 9 it is to be noted that an easily manipulatable adjustment is provided for positioning and locking the sprocket roller 53 on its supporting shaft 54. Intermediate the ends of shaft 54 there is formed a snap ring groove in which a snap ring 64 is mounted. To the right of this ring 64 the two halves of sprocket roller 53 are rotatably mounted on the shaft 54 and continuing outwardly from the right side of the outer half 53b there is a washer 65 with a D-shaped hole therethrough. The right end of shaft 54 is threaded to engage and retain a knurled nut 66. A flat 68 is provided on this threaded end portion so that the D-shaped hole which is sized so as to slide on this threaded end of the shaft 54 permits washer 65 to be only axially movable while being non-rotatable. When knurled nut 66 is loosened, the portions 53a and 53b are ratatably indepentently of and on the shaft and its rotation. The tightening of the knurled nut moves it inwardly causing the portions 53a and 53b to be locked between snap ring 64 and D-washer 65 so that when so locked therebetween, the rotation of sprocket portion 53a produces a like rotation of shaft 54. The shaft may be held in non-rotating position by means of a screw driver in screw driver slot 69 in the outer end of the shaft.

Referring still to FIGS. 8 and 9, the roller assembly 52 includes a bearing support 70 having the bore sized to rotatably support and retain shaft 54. The outer left end of support 70 is shouldered so as to be a press fit mounting into an appropriately sized hole in the front wall of the frame 10. The inner or left end of shaft 54 is reduced in diameter and is threaded to engage and retain a nut 71. Also carried on this inner end is a spur gear 72 having a hub extending from one side. The bore of this gear is stepped with the smaller bore sized to freely slide over the threaded end while the larger bore is precisely sized and shouldered so as to snugly fit on the larger bearing portion of shaft 54. Mounted as in FIG. 8, the gear 72 is locked on shaft 54 by means of tightening the nut 71, and concentricity of gear and shaft is insured by the snug fit of the larger bore of the gear on the bearing portion of the shaft. The face of the hub of the gear acts as a retaining shoulder limiting the outward axial movement of the assembled shaft. Snap ring 64 provides the shoulder limiting the inward axial movement of the shaft 54.

Referring once again to FIGS. 1 and 2 it is noted that located to the right of sprocket wheel assembly 52 there is a second guide roller 22 identical in construction, operation and use as the first roller 22 positioned to the left of plate 32, and above described. This rightward or second guide roller is freely rotatable and axially retained on a spool shaft or cap screw 74 in the manner of the shaft 23, above described. From this rightwardly located second guide roller 22 the film 20 is fed upwardly and to the right onto the spool 17 where, by manipulative rotational movement provided by turning hand crank 18 the viewed film 20 is drawn through the apparatus.

Referring next to FIGS. 5, 6 and 7 there is shown an alternate form of film gate assembly generally designated 75 and in which the fixed plate is placed in the upper position. As viewed in the figures a fixed plate 132 is a die-casting or may be made of a drawn sheet of metal. A movable pressure plate 136 preferably formed from a thin sheet of metal is urged by springs 138 toward and against the fixed plate 132. A pair of headed screws 140 are threadedly mounted in tapped holes in plate 132 and on their body portions slidably retain and guide the movable pressure plate by engaging appropriately sized and spaced holes in said movable plate. Between the inner or lower surface of the movable plate and the underside of the head of screws 140 there is mounted springs 138. The screws 140 and springs 138 are similar to if not precisely identical to screws 40 and springs 38 described above. Apertures 134 and 137 are formed, sized and aligned to provide a framing of a light path through the assembled plates. Aperture 134 is provided in fixed plate 132 while aperture 137 is formed in movable plate 136. The apertures 134 and 137 operate in the same manner as apertures 34 and 37 hereinbefore described.

A novel film notching means is provided in the film gate assembly 75 which include a notching lever 150 preferably cast of metal and generally shaped with a tongue or beam portion in which at least an end portion extends outwardly beyond the curved or rounded outer edge of the fixed plate. This extending end portion is sized and shaped so as to be readily grasped and manipulated by the fingers of the operator. Attached to and forming an integral part of the lever 150 are a pair of pivot shaft portions 151 each extending at right angles to and on opposite sides of the lever. These pivot portions are about midway between the ends of the lever and are sized so as to be rotatably retained in bearing stirrups or cups 152 molded or formed in the upwardly directed surface of fixed plate 132. The bearing stirrups are formed to retain the lever both longitudinally and laterally. Extending forwardly or inwardly from the pivot portion of the lever are generally parallel beam portions which after a short extent change direction to move both forwardly and toward each other to join at an inner or distal end upon which there is formed a downwardly directed portion 154 having a terminating cutting edge or end. The cutting or notching end 154 of the pivotally mounted lever is positioned so as to engage and pass through a small opening 155 formed in the movable plate 136. The structure of the lever between the pivot portion and the cutting end defines an opening or passageway which although enlarged is in alignment with aperture 134 in plate 132. A wire spring 157 is mounted in a positioned retaining means formed on the fixed plate and is shaped so as to engage the manipulative end of the lever to urge this end downwardly into the open or non-notching position to the limit provided by cutout 158 provided in the outer curved end of the fixed plate 132.

Below the movable plate 136 there is indicated the rotating prism assembly 45 described in connection with the assembly of FIG. 1. This prism is carried by the front panel of frame 10 and is positioned so as to be aligned in the path of the light produced by a source such as the illuminated bulb 42 of FIG. 1 and with the light passing through the apertures in plates 132 and 136.

Shown in the several views of FIGS. 5, 6 and 7 are portions of the front panel which are projected outwardly to provide a positioning surface for the upper plate 132 and also provides a top closure means for the bearing stirrups 152. Also seen in FIG. 6 is a lens receiving and retaining socket in the box structure 10a. It is also to be noted in FIG. 6 that notching lever 150 has the portion inwardly or to the right of the pivot shaft 151 bent downwardly from the plane of the outwardly directed beam portion.

Referring finally to FIG. 10 there is illustrated a front view of an alternate arrangement to the slip-in loading of FIG. 1. In the embodiment of FIG. 10 the feeding of the film over the first guide roller and the sprocket roller is reversed from the film path of FIG. 1 however the tangential engagement of the film with the sprocket and the substantially straight line arrangement of the film from first guide roller to second guide roller is maintained. As viewed in FIG. 10, from spool 16 the film 20 is led to and over left or first guide roller 22 thence between and through the upper and lower plates of the pressure plate assembly 31. From this assembly the film is led tangentially over sprocket roller assembly 52 and rightwardly under second guide roller 22 and is then wound on spool 17. As thus arranged the position of the first guide roll 22 and sprocket roller assembly 52 is axially lower than in the example of FIG. 1.

USE AND OPERATION

The arrangement of FIGS. 1 and 2; FIGS. 5, 6 and 7 and the alternate form of FIG. 10 show apparatus particularly formed and positioned so that film 20 as it is brought into a position relative to the operative film path is caused to be moved into the desired path by the drawing of the film through the film gate assembly and associated guide rollers and sprocketed roller.

The loading and operating of a film editor of any of the above embodiments requires the reel 16 of film 20 be placed on spool retaining spindle 15 from which the end of the film is then brought to the other reel 17 and is sufficiently wound on this reel for the end to be engaged on the reel. This end usually contains the lead-in strip of film material furnished on the occasion of developing of the reel of film. With the lead-in end now retained, a small portion of film is drawn from reel 16 and this slack portion is brought in the way of both guide rollers 22 and between the fixed and movable plates of the gate assembly and in the way of sprocket wheel 52. The crank 18 is then turned to draw or wind the slack film onto the reel 17. Both guide rollers 22 with their intermediate circumferential portions concaved to provide arcuate surfaces for film support insure that as the film is drawn over each of the roller surfaces it is moved or urged to the central portion of the film transporting surface until an edge of the film engages a notch or shoulder 27 or 28 depending upon the direction of lateral movement of the film. Upon engagement with one shoulder the film is contained and guided by the other shoulder so that said film is in the center of the roller and is then guided by contacting the roller 22.

At the same time that the film 20 is drawn into alignment in guide rollers 22 and is engaged and carried by shoulders 27 and 28 the film is also being pulled into place between the pair of fixed and movable plates 32 and 36 or the paired plates 132 and 136. As it is pulled into the selected path the film slides into and/or drops into groove 33 in the fixed plate 32 or a like groove in fixed plate 132. Concurrently the film 20 is being moved on the concavity of the intermediate portion of the peripheral transporting surface of the sprocket roller assembly 52. As the sprocket wheel 53 is rotated by the drawing of the film across the wheel the film is moved laterally in response to the curved surface and soon engages the shoulder 57. Sometimes before, but certainly shortly after engagement of the film edge and this shoulder 57 one of the series of apertures 61 in the film 20 moves onto and engages one of the sprocket teeth 60 in the wheel 53. The engagement of the apertures and the sprocket teeth cause the sprocket wheel assembly 52 to rotate in response to the pulling of the film.

It is to be noted that the positioning of the left guide roller 22 and the plate assembly 31 or 131 and the rightwardly positioned sprocket roller assembly 52 is of great importance. Looking particularly at FIG. 1, and as reduced to practice, a spacing or gap of about one-sixteenth of an inch is provided between the left and right edges of the fixed plate 32 and respectively the extreme periphery of the left or first guide roller 22 and the sprocket wheel half 53b. The vertical displacement of the film transporting surface of these rollers to the track of the film into and out of the pressure plate assembly is quite important. The path of the film through the pressure plate assembly and by the adjacent rollers approaches a straight line. The deflection of the film from a path from roller to roller to and through the film gate may be a deflection of about one-eighth inch. The amount of deflection is not critical so long as the pathway for pushing in the loose film requires no forming of partial loops and precise placement of the film.

In FIG. 1 the pathway of the film is led under the first guide roller 22 then the film is deflected slightly upward and forwardly to the pressure plate 32 thence forwardly and slightly downwardly to the sprocket wheel 52 and thence to the second guide roller 22. In the alternate embodiment of FIG. 10 the film is led over the first guide roller then is led slightly downwardly and forwardly into the pressure plate assembly 31. From this pressure plate the film is led slightly upwardly and forwardly to the sprocket roller assembly 52 and thence to the second guide roller 22.

The novel slip-in loading concept of this invention as seen in FIG. 1 has a simplified film path through this film editor and requires only that the operator grasp a slightly relaxed length of film intermediate the spools 16 and 17 and bring this length of film under both guide rollers 22 and sprocket wheel 52. Opposite the film pressure plate assembly the film is brought slightly upward and pushed substantially into the space defined between the fixed and movable plates. The winding of the film on the reel 17 takes up this slack and draws the film into the defined pathway described above. This path is the guide means on first and second rollers 22, 52 and the film pathway 33 on the fixed plate of the plate assembly. As in FIG. 1 the slip-in loading of FIG. 10 requires only that the operator grasp a slightly relaxed length of film between spools and bring the film over the first guide roller and the sprocket roller and under the second guide roller. Opposite the film pressure plate assembly 31 the film is brought slightly downward and pushed substantially into the space defined between the fixed and movable plates. Winding of the film on the reel 17 takes up the slack in the film and draws the film into the defined pathway above described.

This slip-in loading is contrary to the general arrangement of the film path in other known hand-powered editors where it is customary to place the film gate at an apex of one partial film loop and to bring the film over the adjoining sprocket wheel in a manner to provide a wrap of the film on the sprocket wheel of at least sixty degrees or more. Such a wrap in the absence of an automatic film loading mechanism requires a certain amount of dexterity and manipulative effort to insure that the apertures of the film are engaged on the sprocket teeth of the sprocket wheel and that the film is positioned in provided guide means. This is in no way to be considered a criticism of the effectiveness of the threading arrangements of known apparatus but only of the ease of effecting the loading. In contrast thereto, the slip-in assembly of the instant invention uses only a tangential engagemet of the film 20 and the sprocket wheel assembly 52. Extensive experiments, and as reduced to practice proves that a wrap of the film on the sprocket wheel where the film is deflected about ten degrees from a horizontal plane provides a sufficient sprocket engagement for a highly successful drive of the sprocket wheel assembly by the advancing of film 20. The rotating of sprocket wheel assembly 52 results in a like rotation of gear 72 and through a train of gears such as gears 81 and 82 drives the engaged gear 48 of the prism assembly 45. In this manner the prism is rotated in a precisely timed relationship to each aperture 61 in the film 20.

The reversal of plates 32 and 36 in the pressure plate assembly shown in FIGS. 5 through 7 in which they are indicated as plates 132 and 136 still does not disturb the general alignment of the film for slip-in insertion in the film editor. As in the manner described above for FIG. 1 the film is brought under the right and left guide rollers 22 and under sprocket roller assembly 52. The film is then brought on top of movable plate 136 and the film in the manner described is tightened or advanced and by troughing action enters and becomes aligned in the desired film path, whereupon, with bulb 42 providing a source of illumination the successive frames of film are viewed on a screen such as screen 84. When desired the operator ceases turning the crank thereby stopping the film advance and upon lifting the end of the notching beam 150 the end 154 engages the film and passing through a portion of the edge thereof makes a notch or nick in the film. During the manipulation of the notching action the opening in the arm in no way blocks or obstructs the passage of the light through the apertures. The gate assembly of FIGS. 5 through 7 when used in the arrangement of FIG. 10 provides the same slip-in loading described above.

Upon completion of the slip-in loading and the engagement of the sprocket and the apertures in the film, an alignment of the frame of the film and the prism is made. This alignment or synchronism is often necessary to accommodate the framing of the film produced by the particular camera or make of camera. Synchronism is achieved by inserting a screw driver blade into screw driver slot 69 and while holding shaft 54 from rotating is the nut 66 is loosened. Still holding shaft 54 the prism is squared to the light path for maximum viewing and the film and engaged sprocket is advanced or retarded to cause the film frame to be aligned with the prism and light path. After synchronizing the sprocket is locked in place by tightening nut 66. After once setting most film from the same camera can be run through the editor without readjustment.

The present invention considered as a method provides steps whereby the troughing effect of the guide rollers provide lateral thrusting means to urge the film into a determined film transporting path. Regulation of the film frame in synchronism with the rotation of the prism is provided by moving the sprocket in relation to its own shaft to bring a frame of the film precisely into the light path when a face of the prism is square with said path and tangentially driving said sprocket when the film is pulled through the film guideway and over the guide rolls.

The terms "up," "down," "in," "out," "left," "right" and similar terms are applicable to the apparatus as described in conjunction with the accompanying drawings and it is to be noted that such terms are merely for the purpose of description and do not necessarily apply to a position in which the apparatus may be constructed or used.

Protection by Letters Patent of this invention in all its aspects are the same set forth in the appended claims is sought to the broadest extent that the prior art allows.

What I claim as my invention is:

1. In a film editor for motion picture film having regularly spaced sprocket engaging apertures, the editor having a storage and a wind-up reel, a light source to illuminate the film being edited and a rotating prism acting as a shutter means, and in combination with the rotating prism a slip-in loading assembly for threading the film through the editor wherein the loading assembly is disposed to grossly receive a slightly relaxed portion of film such that upon advancement of the film, the film is moved into a prescribed path and adjacent the rotating prism the film passes through the path of light from said light source, said slip-in loading apparatus comprising: (a) a first guide roller having a troughed film transporting portion formed in a peripheral portion thereof, and a film guiding means formed in the peripheral portion and defining a precise film path; (b) a pressure plate assembly having a fixed and a movable plate, said movable plate being biased toward the fixed plate and providing therebetween a film passageway and support surface; said pressure plate assembly positioned adjacent the first guide roller so that the film passageway and support surface between the plates is positioned slightly above the lower film engaging point of the guide roller; (c) a troughing sprocket roller having its film transporting portion formed with a centrally transversely concave portion, a circumferential film retaining and supporting groove formed in one side of the concave portion, a circumferential film supporting band formed on the other side of the concave portion, a plurality of equally spaced sprocket teeth carried by the roller and adapted to engage the apertures in the film, the teeth extending radially outward from the band portion and with the circumferential groove defining one side of the precise film path, the sprocket roller positioned adjacent the pressure plate assembly but spaced from the pressure plate assembly sufficiently for the film to be laterally inserted between the sprocket roller and the pressure plate assembly so that the film is tangentially engaged by the sprocket roller and moved from a line contact to provide a deflection of about ten degrees from the normal surface of the pressure plate; and (d) a second guide roller disposed between the sprocketed roller and the wind-up reel and positioned out of the plane of the pressure plate assembly and the sprocketed roller an amount sufficient to cause the engaged film to be deflected by the sprocketed roller from a theoretical plane joining the plate assembly and the second guide roller, whereby as a slack portion of film from the storage reel is grossly inserted in the slip-in loading path the film is brought under the first guide roller, between the plates of the pressure plate assembly, thence tangentially in engagement with the sprocket roller and under the second guide roller and to the take-up reel, the slip-in loading path being absent additional deflection sprockets and shoes.

2. A slip-in loading assembly according to claim 1 in which the sprocketed roller is connected to and drives a power transmission adapted to rotatably drive the prism through a gear train, and in which the sprocketed roller is manipulatably adjustably lockable on a supporting shaft and when locked on said shaft drives in synchronism and through said gear train the rotatable prism.

3. A slip-in loading assembly according to claim 1 in which the adjustable releasably lockable sprocket wheel is rotatably mounted and axially movable on its supporting shaft, a shoulder provided on the intermediate portion of the shaft and providing thereby a banking surface against which a face of the sprocketed roller is movable to lock it in engagement with the shaft; a non-rotatable axially movable washer carried on the shaft and positioned to engage the other face of the sprocketed roller and means carried on the shaft for manipulatably moving the axially movable washer into and away from a clamping position on the sprocketed roller.

4. A slip-in loading assembly according to claim 2 in which the fixed plate of the pressure plate assembly has a film receiving groove formed in its upper surface providing therewith a guide and support for the film being edited, and in which the movable plate is carried above the fixed plate and is spring-biased toward the fixed plate, and in which the sprocketed roller is positioned so that the under film engaging surface is adjacent to and is slightly below the table forming surface of the fixed plate.

5. A slip-in loading assembly according to claim 2 in which the fixed plate of the pressure plate assembly has a film receiving groove formed in its downwardly facing table surface providing therewith a guide and support for the film being edited, and in which the movable plate is carried below the fixed plate and is spring-biased toward the fixed plate, and in which the sprocketed roller is positioned so that its upper film engaging surface is adjacent to and is slightly above the table under surface of the fixed plate.

6. A slip-in loading assembly according to claim 2 in which the pressure plate assembly is provided with a means for notching the film as it is brought in the way of the light path, said means for notching comprising a lever pivotally supported intermediate its ends in stirrups on the fixed support plate; means for retaining the lever pivots in the stirrups; an aperture formed in a portion of the lever through which the light path is allowed to freely pass; a terminating cutting end formed on the inner end of the lever and positioned to engage and pass through a mating and like sized receiving opening formed in the movable plate the cutting end adapted to notch the film as it is brought into the mating opening; and biasing means for urging the lever into a non-notching position.

7. A slip-in loading assembly according to claim 4 in which the first guide roller is positioned so that the space between the extreme periphery of the roller and the incoming edge of the table surface of the fixed plate is about one-sixteenth of an inch and the vertical displacement of the film path around the first guide roller is about one-eighth of an inch below said table surface and the sprocketed roller is positioned so that the extreme periphery of the sprocketed roller and the outgoing edge of the table surface is about one-sixteenth of an inch and the vertical displacement of the film path as it passes tangentially across the sprocketed roller and from the plane of the table surface of the fixed plate is about one-eighth of an inch.

8. A slip-in loading assembly according to claim 7, in which the film path from the table surface of the fixed plate to the second guide roller approaches a straight line with a deflection of about one-eighth of an inch being caused by the positioned engagement of the sprocketed roller in the way of the film path.

9. A slip-in loading assembly according to claim 8 in which the film pathway is under the first guide roller thence upwardly and forwardly through the pressure plate assembly and across the table surface thence forwardly and slightly downwardly to and under the sprocketed wheel thence forwardly to and under the second guide roller and to the wind-up reel.

10. A slip-in loading assembly according to claim 5 in which the first guide roller is positioned so that the space between the extreme periphery of the roller and the incoming edge of the table surface of the fixed plate is about one-sixteenth of an inch and the vertical displacement of the film path around the first guide roller is about one-eighth of an inch below said table surface and the sprocketed roller is positioned so that the extreme periphery of the sprocketed roller and the outgoing edge of the table surface is about one-sixteenth of an inch and the vertical displacement of the film path as it passes tangentially across the sprocketed roller and from the plane of the table surface of the fixed plate is about one-eighth of an inch.

11. A slip-in loading assembly according to claim 10 in which the film pathway is under the first guide roller thence upwardly and forwardly in engagement with the under table surface thence slightly upwardly and forwardly to and tangentially over the sprocketed wheel thence forwardly to and under the second guide roller to the wind-up reel.

12. In a film editor for motion picture film having regularly spaced sprocket engaging apertures, the editor having a storage reel and a wind-up reel and in between said reels a light source to illuminate the film being edited, a rotating prism acting as a shutter means in the path of light from the light source, and in combination with the rotating prism a slip-in loading assembly disposed for threading the film through the editor wherein the loading assembly is disposed to grossly receive a slightly relaxed portion of film such that upon advancement of the film, the film is aligned in a prescribed path which passes through the light adjacent the rotating prism; said slip-in loading apparatus comprising: (a) a first guide roller having a troughed film transporting portion formed in a peripheral portion thereof and a film guiding means formed in the peripheral portion and defining a precise film path; (b) a pressure plate assembly having a fixed and a movable plate, said movable plate being biased toward the fixed plate and providing therebetween a film passageway and support surface, said pressure plate assembly positioned adjacent the first guide roller so that the film pasageway and support surface between the plates defines a plane which intersects the first guide roller at a point which lies between its transporting surface portion and its axis; (c) a troughing sprocket roller having its film transporting portion formed with a centrally transversely concave portion, a circumferential film retaining and supporting groove formed in one side of the concave portion, a circumferential film supporting band formed on the other side of the concave portion, a plurality of equally spaced sprocket teeth carried by the roller and adapted to engage the apertures in the film, said teeth extending radially outward from the band portion and with the circumferential groove defining one side of the precise film path, the sprocket roller positioned adjacent the pressure plate assembly but spaced from the pressure plate assembly sufficiently for the film to be laterally inserted between the sprocket roller and the pressure plate assembly so that the film is tangentially engaged by the sprocket roller and moved from a line contact to provide a deflection of about ten degrees from the normal surface of the pressure plate; and (d) a second guide roller disposed between the sprocketed roller and the wind-up reel and positioned out of alignment of the pressure plate assembly and the sprocketed roller an amount sufficient to cause the engaged film to be deflected by the sprocketed roller from a theoretical plane joining the plate assembly and the second guide roller whereby as a slack portion of film from the storage reel is grossly inserted in the slip-in loading assembly the film is brought into a film pathway with the film passing over the first guide roller thence downwardly and forwardly in engagement with the under table surface of the pressure plate assembly thence slightly upwardly and forwardly to and tangentially over the sprocketed roller thence forwardly to and under the second guide roller to the wind-up reel, the slip-in loading path being absent additional deflection sprockets and shoes.

References Cited

UNITED STATES PATENTS

| | | | |
|---|---|---|---|
| 2,482,179 | 9/1949 | Harrison | 352—119 |
| 1,638,392 | 3/1926 | Case | 352—224 X |
| 2,032,184 | 2/1936 | Schiffl. | |
| 2,123,882 | 7/1938 | Draeger | 352—129 X |
| 2,425,217 | 8/1947 | Wienke | 352—221 |
| 2,906,167 | 9/1959 | Castedello | 352—119 X |
| 3,040,945 | 6/1962 | Lunzer | 352—158 X |

FOREIGN PATENTS

| | | |
|---|---|---|
| 649,699 | 1/1951 | Great Britain. |
| 110,120 | 5/1925 | Switzerland. |

NORTON ANSHER, *Primary Examiner.*

MONROE H. HAYES, *Assistant Examiner.*

U.S. Cl. X.R.

352—129, 224